United States Patent [19]
Heiss

[11] 3,734,601
[45] May 22, 1973

[54] FLOW CELL ASSEMBLY FOR COLORIMETRIC MEASUREMENTS

[75] Inventor: Louis Robert Heiss, Annapolis, Md.

[73] Assignee: Baxter Laboratoris, Inc., Morton Grove, Ill.

[22] Filed: July 8, 1971

[21] Appl. No.: 160,776

[52] U.S. Cl.................356/246, 250/71 R, 356/73, 356/96
[51] Int. Cl..........................G01n 1/10, G01n 21/00
[58] Field of Search..........................356/246, 96, 87, 356/98, 51, 73; 250/71 R, 218

[56] References Cited
UNITED STATES PATENTS

| | | | |
|---|---|---|---|
| 3,433,952 | 3/1969 | Howerton | 250/71 R |
| 3,240,111 | 3/1966 | Sherman et al. | 356/96 |
| 3,345,910 | 10/1967 | Rosin et al. | 356/246 |
| 3,635,561 | 1/1972 | Bordonali et al. | 356/87 |
| 3,236,602 | 2/1966 | Isreeli | 356/246 |

OTHER PUBLICATIONS

New Fluoro–Microphotometer for Automatic Anal., American Instrument Co., Inc.; Supp. Bulletin 2,390–2,392 Aug. 1968.

Primary Examiner—Ronald L. Wibert
Assistant Examiner—V. P. McGraw
Attorney—Samuel B. Smith, Jr.

[57] ABSTRACT

A flow cell assembly for adapting an apparatus for both fluorometric and colorimetric studies. The assembly includes a holder having a folded optical path between an external light source and photosensitive response means. The light input to the optical path is at right angles to the light output therefrom so that the assembly may be employed in place of the sample cuvette of a conventional spectrofluorescence measuring instrument. The holder contains a flow tube having an offset sight passageway portion supported endwise in the optical path. The holder includes a light shield plate slotted to receive the legs of the offset portion and to substantially protect the offset sight passageway portion and the folded optical path from stray light. The flow tube may include an integral debubbler.

18 Claims, 7 Drawing Figures

INVENTOR
LOUIS ROBERT HEISS
BY Samuel B. Smith, Jr.
ATTORNEY

FLOW CELL ASSEMBLY FOR COLORIMETRIC MEASUREMENTS

This invention relates to flow cells for colorimetric measurement. More particularly, however, the invention relates to a flow cell assembly which may be employed with known spectrofluorescence measuring apparatus thereby to adapt the latter both for operation as a colorimeter through absorption measurements and as a fluorometer.

Most apparatus known to the art of the type now under consideration functions not in a dual capacity including use as a fluorometer and a colorimeter but rather in one capacity or the other. Typically this is the case since fluorometric measurements are carried out through utilization of a light path which is short relative to the light path often necessary when carrying out absorption measurements in colorimetric and turbidimetric determinations. In this connection, fluorometric measurements are carried out with the detector at right angles to the source of excitation light and it responds to fluorescent emission from the sample rather than the amount of light absorption within the sample. On the other hand in colorimetric measurements the detector responds to the light which passes through the sample and the type of sample, i.e., a dilute solution, for example, may require different length light paths. Thus, in many instruments the cell compartment without modification prevents the dual use of the instrument, as described, when in a colorimetric measurement a light path of up to 100 mm. is required.

In view of the foregoing, it is a main object of the invention to provide a novel and improved flow cell assembly capable of both mechanical and optical interchangeability with the sample cuvette of a spectrofluorometric apparatus thereby to enable the apparatus to function both as a fluorometer and as a colorimeter through absorption measurements.

Another object of the invention is to provide an improved flow cell assembly which may be readily employed to adapt a spectrofluorometer apparatus for use in quantitative colorimetric analysis of a liquid stream with respect to a particular ingredient thereof and for continuously monitoring said stream with respect to said ingredient.

A further object of the invention is to provide a flow cell assembly, as defined above, which not only has versatility of use but also has use capability over a wide range of wavelengths including the ultraviolet and visible range and is constructed in a manner to isolate the sample under observation from stray light. Further, the flow cell assembly may be mounted in vertical fashion in the apparatus to provide rapid wash out through the cell and prevent the trapping of bubbles in the sight chamber.

In accordance with the foregoing objects and as will be hereinafter described in detail the present invention relates to a flow cell assembly which includes a cell holder having an excitation beam inlet and a beam outlet, the axes of which are mutually perpendicular. Preferably the cell holder is of opaque construction to isolate the interior from stray light.

Means disposed between the openings form an optical path for the excitation beam through the housing. Also disposed within the housing is a length of transparent tubing providing a continuous path for the fluid sample under observation. The optical means and the flow path including a sight chamber are so disposed that the excitation beam passes through the sight chamber tube axis within the cell holder prior to exiting the cell holder. The cell holder is adapted to support a flow cell including a sight chamber of various lengths, as required, to permit a colorimetric measurement on various samples.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other devices for carrying out the several purposes of the invention. It is important, therefore, that the claims be regarded as including such equivalent constructions as do not depart from the spirit and scope of the invention.

Specific embodiments of the invention have been chosen for the purpose of illustration and description and are shown in the accompanying drawings forming a part of the specification wherein:

FIG. 6 is a horizontal cross-section of the flow tube construction taken substantially on the line 6—6 of FIG. 2, with, however, assembly substantially in top plan view; and FIG. 7 is a view similar to FIG. 1 illustrating, however, only a portion of the flow tube and optical path.

Figure 1:
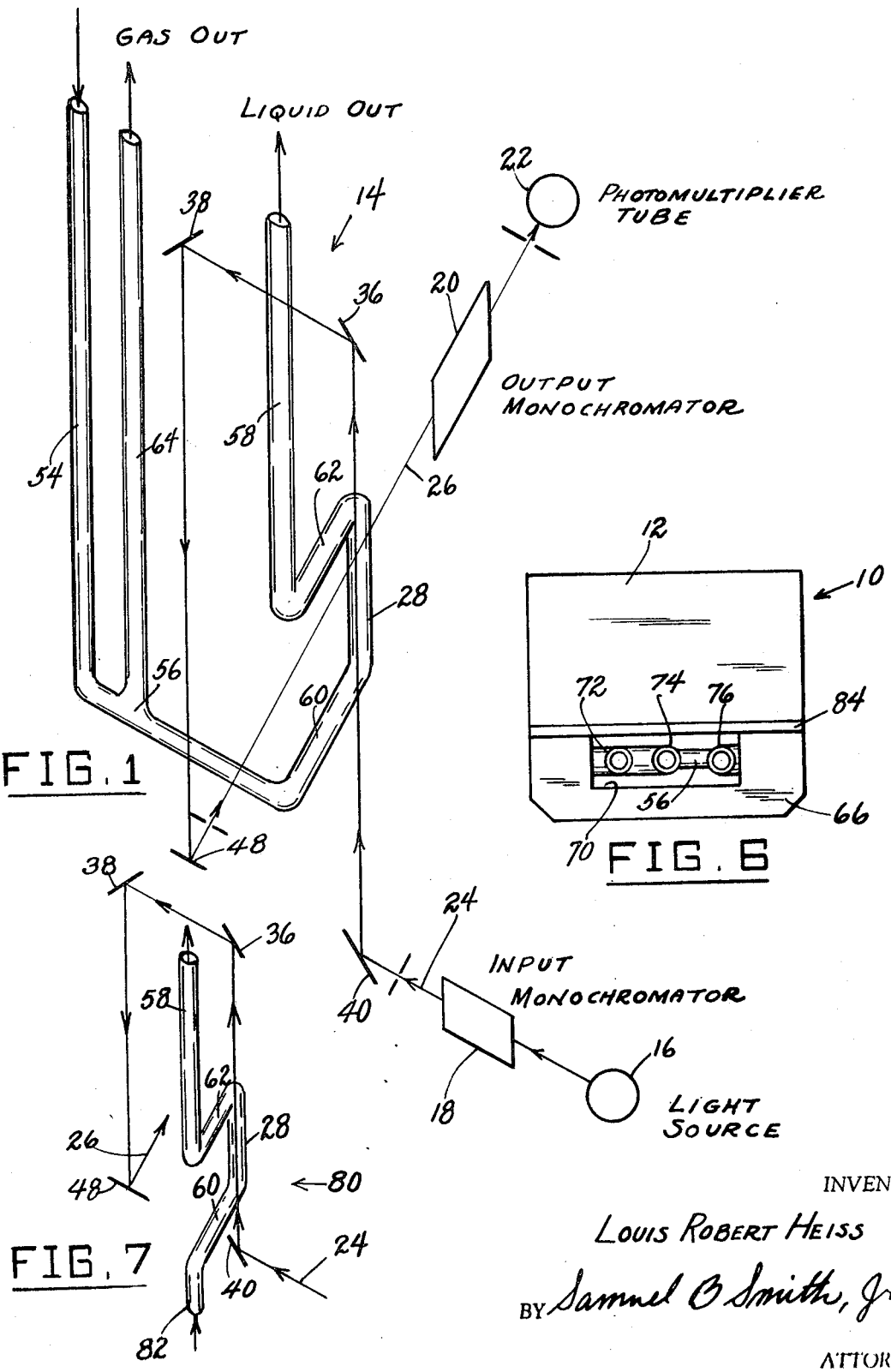
FIG. 1 is a perspective view of a flow tube and an optical path together with a part of the optical system of a spectrofluorometer, the optical portions being shown diagrammatically.

Referring now to the Figures the flow cell assembly of the present invention is designated by the numeral 10. The assembly generally includes a housing or cell holder 12 and a flow cell comprising a length of tubing 14 providing a sight chamber supported therein. The assembly, as has been discussed, may be used as an accessory with a spectrofluorometer such as the type disclosed in U.S. Pat. No. 2,971,429 which issued to Hugh K. Howerton and which is assigned to the assignee of the present application. As also discussed, it may be used in other devices of similar nature to permit colorimetric measurements.

In general the spectrofluorometer includes a light source 16, an adjustable input monochromator 18, a transparent cuvette or sample cell and cell holder of square cross-section, an adjustable output monochromator 20 and a photomultiplier tube or other light responsive means 22. The monochromators, source and responsive means are positioned external to the cell holder. The light source generates in excitation beam 24, a particular selected wavelength of which is caused to impinge upon the cuvette or sample cell containing the material under observation. Impingement will be substantially at an angle perpendicular to the cuvette or sample cell. The selection of wavelength is accomplished by an input monochromator 18 disposed between the light source and a light inlet opening of the cell holder. The cell holder, in a face at right angles to the face providing the inlet opening, includes an outlet opening through which fluorescent emission generated in the cell by the sample is communicated to the light responsive means 22. The fluorescent emission in the form of a beam 26 also passes through an output monochromator which functions to select a particular component of wavelength enabling desired measurements to be made providing pertinent information as to the ingredients and other characteristics of the sample under test.

The flow cell assembly 10 is adapted to be inserted in the aforesaid spectrofluorometer in substitution for the sample cuvette of like holder construction to enable the apparatus to be employed for fluorescence or absorption measurements of liquid samples, either flowing or static. Thus, by employing the assembly 10, as will be presently described, an accurately selected monochromatic beam from the light source 16 may be passed through a known path length of the liquid sample, in the direction of flow, and the emergent beam 26, which may be the result either of absorption of fluorescence in the liquid sample, or a combination of both, may be accurately studied. In this connection the adjustable output monochromator 20 is employed to analyze the spectral composition of the emission beam qualitatively. The response of photomultiplier tube 22 is utilized for quantitative measurements.

An important purpose of the flow cell assembly 10 is to orientate a sight chamber 28 of accurately known length in alignment with and in the path of the excitation beam 24 from light source 16. The sight chamber forms a portion of the flow cell 14 through which liquid to be analyzed is flowing. As indicated, however, the liquid to be analyzed may be in a static condition within the sight chamber. At least the sight chamber portion of the flow cell will be formed of transparent material.

The flow cell assembly 10 comprises a cell holder 12 of generally rectangular cross-section. The cell holder is formed from a material that provides not only a relatively rigid and sturdy body but also one which is opaque thereby substantially to exclude stray light from impinging upon the sight chamber. The cell holder is formed with a U-shaped recess comprising spaced parallel longitudinal channels 30 and 32 and a transverse channel 34 connecting the top ends of the former. Opposing plane mirrors 36 and 38 are mounted in the opposite corner portions of channel 34. A further plane mirror 40 is mounted in a recess 42 subjacent the lower end of channel 30, the recess 42 being open to channel 30 through a passage 44. The recess 42 is also open to one side of body 12 through a passage 46. The latter passage provides an inlet to the flow cell for excitation light beam 24.

A further plane mirror 48 is mounted in the lower end of channel 32. The mirror 48 is disposed adjacent a passage 50 formed in a rear wall 52 of the cell holder 12. The passage 50 provides an outlet opening to monochromator 20 for the emission light 26.

All of the mirrors 36, 38, 40 and 48 are front surface mirrors and disposed at substantially 45° in relation to the various channels 30, 32, etc. Thus, the several mirrors permit an extended light path through the assembly and provide that the light emission from source 16, a particular wavelength which is selected by the monochromator 18, passes through the axis of the sight chamber and the fluid sample under observation prior to exiting the cell holder at a location 90° displaced from the entrance thereto. To this end the excitation light beam upon entering the cell holder is reflected by mirror 40 through the sight chamber 28 and then reflected again by mirrors 36, 38 and 48 toward the monochromator 20. The emission beam 26 exits the cell holder as a horizontal beam substantially at right angles to the horizontal excitation beam 24.

The flow tube 14 includes a liquid-gas inlet leg 54, a bottom leg 56 normal thereto and a liquid outlet leg 58 parallel to and substantially in the plane of leg 54.

A rectangular generally U-shaped conduit portion perpendicular to the plane of legs 54, 56 and comprising a bottom tubular portion 60, the sight tube portion 28 and a top tubular portion 62 connects the outlet leg to the bottom leg. Sight tube portion 28 is parallel to legs 54 and 58 but is rearwardly (see FIG. 1) offset from the plane thereof by the rearwardly directed tube portions 60 and 62. The sight tube chamber portion may be of any length. For standard tests a length of from 10 to 25 mm. may be employed. However, the sight tube chamber portion, by a suitable increase in height of the cell holder, may even be provided in lengths of up to, for example, 100 mm.

The flow tube element 14 may be provided with an integral debubbler tube 64 extending from bottom leg 56 adjacent inlet leg 54. The debubbler tube 38 is connected to a suitable vacuum pump (not shown) for removing gas from the liquid flowing through leg 56. Thus, the liquid to be studied enters the leg 54, flows through the sight tube portion 28 and the outlet leg 58, gas bubbles being removed through the debubbler tube 64. In this manner no error will be introduced by unwanted air embolisms within the sight chamber 28.

Figure 2:
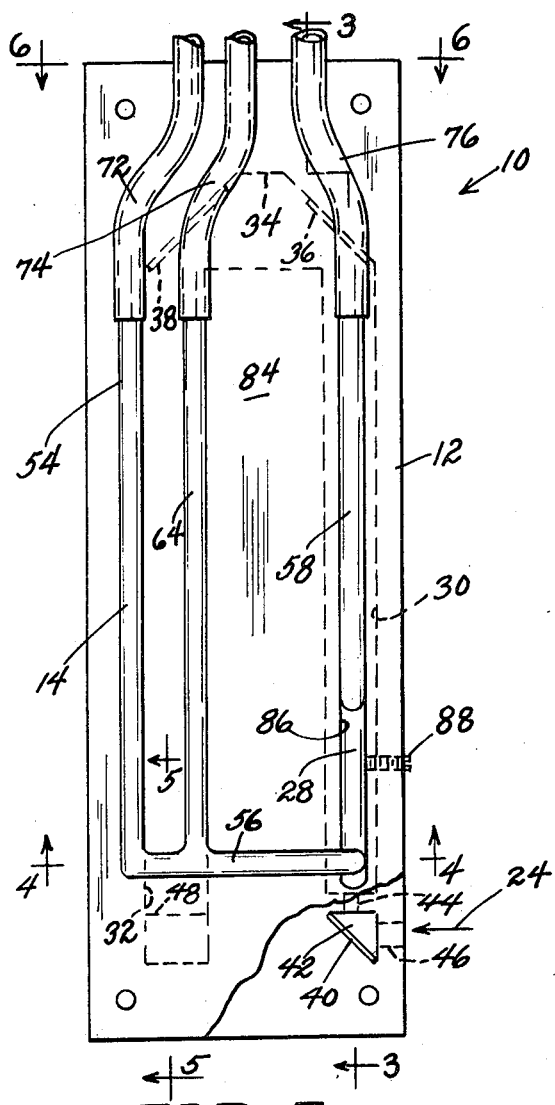
FIG. 2 is a front elevational view of a flow cell adapter assembly with the front cover removed and with its light shield plate partly broken away to illustrate the flow tube of FIG. 1.
Figure 3:
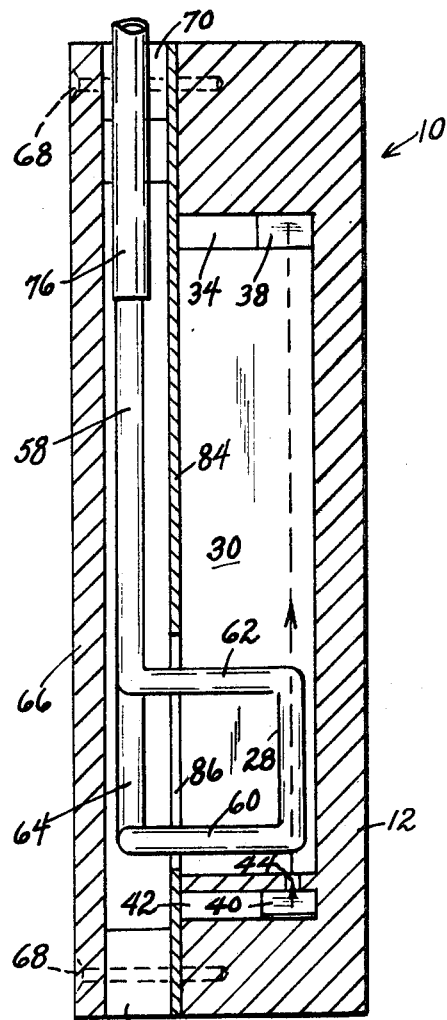
FIG. 3 is a vertical cross-section taken substantially on line 3—3 of FIG. 2, with, however, the front cover of the assembly secured thereon.
Figure 4:
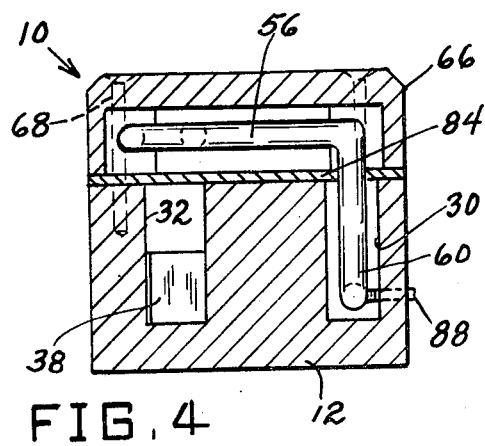
FIG. 4 is a horizontal cross-section taken substantially on the line 4—4 of FIG. 2.
Figure 5:
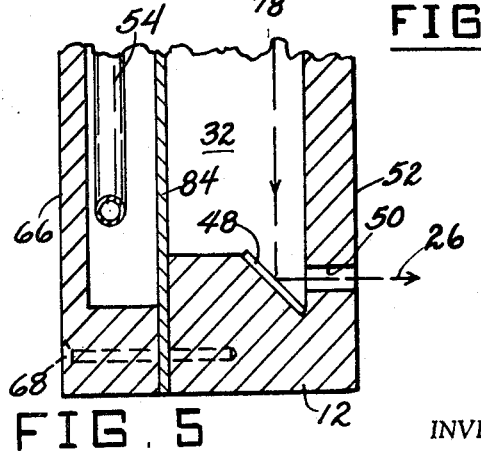
FIG. 5 is a fragmentary vertical cross-section taken substantially on the line 5—5 of FIG. 2.

Closing the cell holder is an opaque hollow cover 66. The cover may be releasably fastened to the cell holder by any suitable means as for example corner screws 68. The top wall of the cover is notched at 70 to provide clearance for flexible conduits 72, 74 and 76 connected, respectively, to the tubular leg portions 54, 64 and 58, as shown in FIG. 2. The bottom wall of the cover may be provided with another clearance notch 78 to allow the alternative use of a flow cell element 80 (FIG. 7) which is somewhat similar to flow cell 14 except it does not employ a debubbler leg. In the flow cell of FIG. 7 the liquid to be studied is admitted directly to the offset sight tube branch 28 through a bottom conduit element 82 which is longitudinally aligned with outlet leg 58.

An opaque light shield plate 84 is clamped between the cover 66 and the cell holder 12. The plate is formed with a longitudinal slot 86 through which the rearwardly directed tube portions 60 and 62 are snugly engaged. The portions 60 and 62 therefore function to support the flow cell 14 in proper orientation such that the sight tube portion is in alignment with the optical path between mirrors 40 and 48. A Nylon set screw 88 is threaded through the side wall of channel 30 and clampingly engages the midportion of sight tube element 28 to hold the flow cell 14 (or 80) in operating position.

In operation, the assembly is mounted in the spectrofluorometer in place of and in substitution for the original sample cuvette, as above explained. The input monochromator 18 is set to pass the desired wavelength of excitation beam, the beam upon entering the cell holder being reflected by front surface mirror 40 endwise through the sight tube portion 28 and the sample under study therein. As indicated, this sample may be in either a static or a dynamic state. The emission beam emerging from the top end of sight tube portion 28 is reflected by mirrors 36, 38 and 48 through the exit passage 50 whereupon the emission beam 26 passes through the output monochromator 20. The spectral composition and intensity of emission beam 26 may be studied and measured by the output monochromator 20 and the photomultiplier tube 22 thereby to provide characteristic data associated with the sample within the sight tube element 28. This data may be in a form such as wavelength absorption, fluorescence, phosphorescence, and the like.

The interior surfaces of cover 66 and the U-shaped recess in cell holder 12 are preferably blackened to minimize stray light reflections in the interior of the flow cell assembly.

The flow cell assembly may be suitably water-jacketed or immersed in a temperature-controlled bath during use if so desired, with suitable conduits being provided for the input excitation beam 24 and the emission beam 26.

Thus, it will be seen from the above that in accordance with the present invention there is provided a new and useful flow cell assembly for permitting use of an apparatus for both fluorometric and colorimetric measurements.

While the improved flow cell assembly for use with a spectrofluorometer, with particular reference to a preferred form thereof, has been disclosed in the foregoing description, it will be understood and obvious to those skilled in the art to which the invention pertains, after understanding the invention, that various modifications within the spirit of the invention may be made therein without departing from the spirit and scope of the appended claims.

Having described the invention, what is claimed is:

1. In an apparatus having a sample-receiving space, means for generating an excitation beam and directing said beam along a first path toward said sample-receiving space, photosensitive means located along a second path substantially at right angles to said first beam path to receive radiation from said sample-receiving space, a flow cell element for liquid to be analyzed, said flow cell element including an elongated transparent sight chamber whose axis is without said first path, means defining an optical path between said first and second paths and substantially along the axis of said sight chamber, and means to support said flow cell element and optical means within said space whereby the radiation from said space is representative of said liquid to be analyzed.

2. The apparatus of claim 1, and wherein the means generating said excitation beam includes a monochromator for selecting the wavelength of the excitation beam.

3. The apparatus of claim 1, and wherein the optical path leading to said photosensitive means includes a monochromator for selecting a wavelength of said emission.

4. The apparatus of claim 1 wherein said sight chamber comprises an offset portion of a transparent main tubular body containing said liquid to be analyzed, said offset portion having respective end legs integrally connecting it to said main tubular body.

5. The apparatus of claim 4, and wherein said offset portion is substantially parallel to the main tubular body.

6. The apparatus of claim 5 further comprising an opaque housing, said flow cell element and optical path means defining a folded optical path supported within said housing.

7. The apparatus of claim 6, and an opaque light shield plate secured around said end legs in said housing in a plane between said offset portion and the main tubular body.

8. The apparatus of claim 7, and wherein said shield plate has a slot through which said end legs are snugly received.

9. The apparatus of claim 8, and a clamping screw threadedly engaged through a wall portion of said housing adjacent said offset portion and supportingly engaging said offset portion.

10. A flow cell assembly comprising an opaque housing having an excitation beam inlet passage and a radiation outlet passage having an optical axis substantially perpendicular to the optical axis of the excitation beam inlet passage, a liquid flow tube having a substantially parallel transparent offset portion defining a sight chamber, said sight chamber being disposed on an axis without said axis of said inlet passage, means defining an optical path between said inlet passage and said outlet passage and substantially along the axis of said sight chamber, and means supporting said liquid flow tube and said optical means in said housing.

11. The flow cell assembly of claim 10, and wherein an opaque light shield plate is provided in said housing between the plate of said offset portion and the main plane of said flow tube.

12. The flow cell assembly of claim 11, and wherein said sight chamber has respective end legs at right angles thereto integrally connecting the sight chamber to the flow tube, said light shield plate having a slot snugly receiving said end legs.

13. The flow cell assembly of claim 12, and a clamping screw threadedly engaged through a wall portion of said housing adjacent said sight chamber and supportingly engaging said sight chamber.

14. The flow cell assembly of claim 10, and wherein said flow tube has an inlet portion and is provided with a debubbler conduit integrally connected thereto adjacent said inlet portion.

15. The flow cell assembly of claim 10, and wherein said housing is substantially square in cross-section and wherein said excitation beam inlet passage and emission outlet passage are located in adjacent mutually perpendicular walls of said housing.

16. The flow cell assembly of claim 15, and wherein said housing comprises a main block and a hollow cover secured on said main block, said main block having a generally U-shaped recess provided with angled corner mirrors and said mutually perpendicular walls have recesses exposed to and adjacent said inlet and outlet passages and exposed to the ends of said U-shaped recess, said last-named recesses having angled mirrors, said mirrors being mutually oriented to define said optical path between the inlet and outlet passages, said flow tube offset portion being supported longitudinally in one side of said U-shaped recess.

17. The flow cell assembly of claim 16, and an opaque light shield plate disposed between said main block and said hollow cover, said shield plate having a slot over one side of the U-shaped recess and said offset portion having integral end supporting legs snugly engaged through said slot, whereby said sight chamber is substantially shielded from stray light in said cover.

18. The flow cell assembly of claim 17, and a clamping screw threadedly engaged through the housing wall adjacent said one side of the U-shaped recess and supportingly engaging said offset portion.

* * * * *